United States Patent

Pizanti et al.

[11] Patent Number: 5,950,993
[45] Date of Patent: Sep. 14, 1999

[54] ANTIVIBRATION SUPPORT INCLUDING A CENTRAL LEG, AND A MOTOR VEHICLE INCLUDING SUCH A SUPPORT

[75] Inventors: Thierry Pizanti, La Ferte Villeneuil; Alain Bellamy, Naveil, both of France

[73] Assignee: Hutchinson, Paris, France

[21] Appl. No.: 08/974,170

[22] Filed: Nov. 19, 1997

[30] Foreign Application Priority Data

Nov. 28, 1996 [FR] France ................................ 96 14591

[51] Int. Cl.⁶ .................................................. F16F 15/04
[52] U.S. Cl. ................................ 267/140.13; 267/140.11
[58] Field of Search ......................... 267/140.11, 140.13, 267/140.14, 140.15, 219, 220

[56] References Cited

U.S. PATENT DOCUMENTS

| 4,262,886 | 4/1981 | Le Salver et al. ............. | 267/140.13 |
| 4,392,639 | 7/1983 | Konishi ......................... | 267/140.13 |
| 4,790,521 | 12/1988 | Ide et al. ...................... | 267/140.13 |

FOREIGN PATENT DOCUMENTS

| 2 726 339 | 5/1996 | France . | |
| 36 10 611 A1 | 10/1987 | Germany . | |
| 355149436 | 11/1980 | Japan ............................. | 267/140.13 |

*Primary Examiner*—Matthew C. Graham
*Attorney, Agent, or Firm*—Marshall, O'Toole, Gerstein, Murray & Borun

[57] ABSTRACT

An antivibration support has two rigid strength members interconnected by an elastomer body having both a bell-shaped side wall and a central leg extending inside the side wall from the top of the elastomer body to a baseplate secured to one of the two strength members. The side wall has an aspect ratio lying in the range 2 to 8, while the central leg has an aspect ratio of less than 2, such that when a predetermined static axial load is applied to the support, the side wall is subjected to buckling and then presents substantially zero stiffness while the central leg is not subject to buckling.

11 Claims, 3 Drawing Sheets

ANTIVIBRATION SUPPORT INCLUDING A CENTRAL LEG, AND A MOTOR VEHICLE INCLUDING SUCH A SUPPORT

FIELD OF THE INVENTION

The present invention relates to antivibration supports, and to motor vehicles including such supports.

More particularly, the invention relates to an antivibration support designed to be interposed between two rigid elements to damp and attenuate vibratory motion between said two elements along a vertical central axis and to support a static axial load, lying in the range 500 Newtons (N) to 2500 N, that is exerted by one of the two elements, said support comprising first and second rigid strength members designed to be secured respectively to the first and second rigid elements that are to be united, and an elastomer body interconnecting the two strength members, said elastomer body having a bell-shaped side wall which extends axially, flaring from a top secured to the first strength member down to an annular base secured to the second strength member, said side wall having at least one slender portion which presents a free length l between the top and the base of the elastomer body and which presents an average thickness e such that the ratio l/e lies in the range 2 to 8, the elastomer body also having at least one support portion adapted to support the static load, and a rigid baseplate secured to the second strength member extending to the center of the annular base of the elastomer body.

BACKGROUND OF THE INVENTION

Document FR-A-2 726 339 (see its FIGS. 13 to 15) describes an antivibration support of that type, in which the side wall of the elastomer body includes both two mutually opposite walls that are relatively slender and which constitute the above-mentioned slender portions, and two mutually opposite walls that are less slender and which constitute the above-mentioned support portions.

In that known antivibration support, the two slender walls contribute to diminishing the stiffness of the support, in particular against vibration at a relatively high frequency (greater than 20 Hz, e.g. in the vicinity of 150 Hz).

That phenomenon becomes even more marked when the slender walls are subjected to buckling by the support being loaded.

The antivibration support disclosed in the above-mentioned document provides satisfaction, however it nevertheless suffers from the drawback that the effects due to the flexibility of the slender walls, and in particular the buckling of said walls, are impeded by the fact that said slender walls are connected on either side to two relatively thick and rigid walls, constituting the support portions of the elastomer body.

That known antivibration support therefore does not make it possible to achieve complete independence in operation between the support portions of the elastomer body and the slender portions of the side wall of said elastomer body.

OBJECTS AND SUMMARY OF THE INVENTION

A particular object of the present invention is to mitigate those drawbacks.

To this end, according to the invention, in the antivibration support of the kind in question, the above-mentioned slender portion constitutes all of the side wall of the elastomer body, and the elastomer body includes a central leg which extends vertically from the top of said elastomer body to contact with the baseplate, said central leg constituting the above-mentioned support portion and presenting, between the top of the elastomer body and the baseplate, a free height h and an equivalent diameter d such that the ratio h/d is less than 2, (the equivalent diameter d can either be the mean diameter of the central leg if the central leg is in the form of a circular cylinder, or, more generally, it can be given by $d=2(S/p)^{1/2}$, where S is the mean area of the horizontal section of the central leg), the elastomer body having dimensions such that when the static axial load is applied to the support, the entire side wall of the elastomer body is subjected to buckling and presents substantially zero elastic stiffness, without the central leg being subjected to buckling.

Complete decoupling is thus provided between the operation of the central leg which supports the permanent load applied to the support, and the behavior of the slender side wall when vibrations are applied to the support.

In particular, the buckling of the side wall of the elastomer body imparts low stiffness to the hydraulic antivibration support relative to vibration of relatively small amplitude (e.g. less than 1 mm) and of relatively high frequency (e.g. greater than 20 Hz, and in particular about 150 Hz).

This gives rise to very good absorption of such vibration at high frequency, and thus to better sound insulation between the first and second rigid elements interconnected by the antivibration support.

Also, because of the presence of the central leg of the elastomer body, the low stiffness of the support at audible frequencies does not thereby give rise to excessive axial displacement of the two strength members relative to each other.

In preferred embodiments, use may optionally also be made of one or more of the following dispositions:

the side wall of the elastomer body co-operates with the baseplate to define a working chamber which communicates, via a narrow passage, with a compensation chamber defined by an easily deformable wall, the working chamber, the compensation chamber, and the narrow passage together forming a sealed volume filled with liquid;

the side wall of the elastomer body, in section on a vertical plane containing the central axis, is concave in shape with its concave side facing outwards from the working chamber: this disposition favors buckling of the side wall of the elastomer body towards the inside of the working chamber, thereby further improving the hydraulic efficiency of the antivibration support;

the ratio l/e lies in the range 3 to 6;

the ratio h/d lies in the range 0.5 to 0.7;

the elastomer body is circularly symmetrical about the central axis;

the baseplate has an annular rim surrounding the central leg of the elastomer body;

the baseplate forms a portion of a rigid partition which is fixed to the second strength member and which is interposed between the working chamber and the compensation chamber, said rigid partition defining the narrow passage and also including a passage between the two chambers, said passage being obstructed by a valve member having two main faces, one in communication with the working chamber and the other in communication with the compensation chamber, and including at least a portion that is freely movable towards the working chamber and towards the compensation chamber with clearance of less than 1 mm; and the central leg is prestressed in compression by the side wall of the elastomer body.

The invention provides a motor vehicle including an antivibration support as defined above and two rigid elements interconnected by said support, one of the two rigid elements imposing a vertical static load lying in the range 500 N to 2500 N on the support, the side wall of the elastomer support being subjected to buckling and then presenting substantially zero elastic stiffness, while the central leg is not subject to buckling.

The two rigid elements in question may be constituted, in particular, respectively by the drive unit and by the structure of the vehicle.

BRIEF DESCRIPTION OF THE DRAWINGS

Other characteristics and advantages of the invention appear from the following detailed description of an embodiment thereof, given by way of non-limiting example and with reference to the accompanying drawings.

In the drawings.

MORE DETAILED DESCRIPTION

Figure 1:
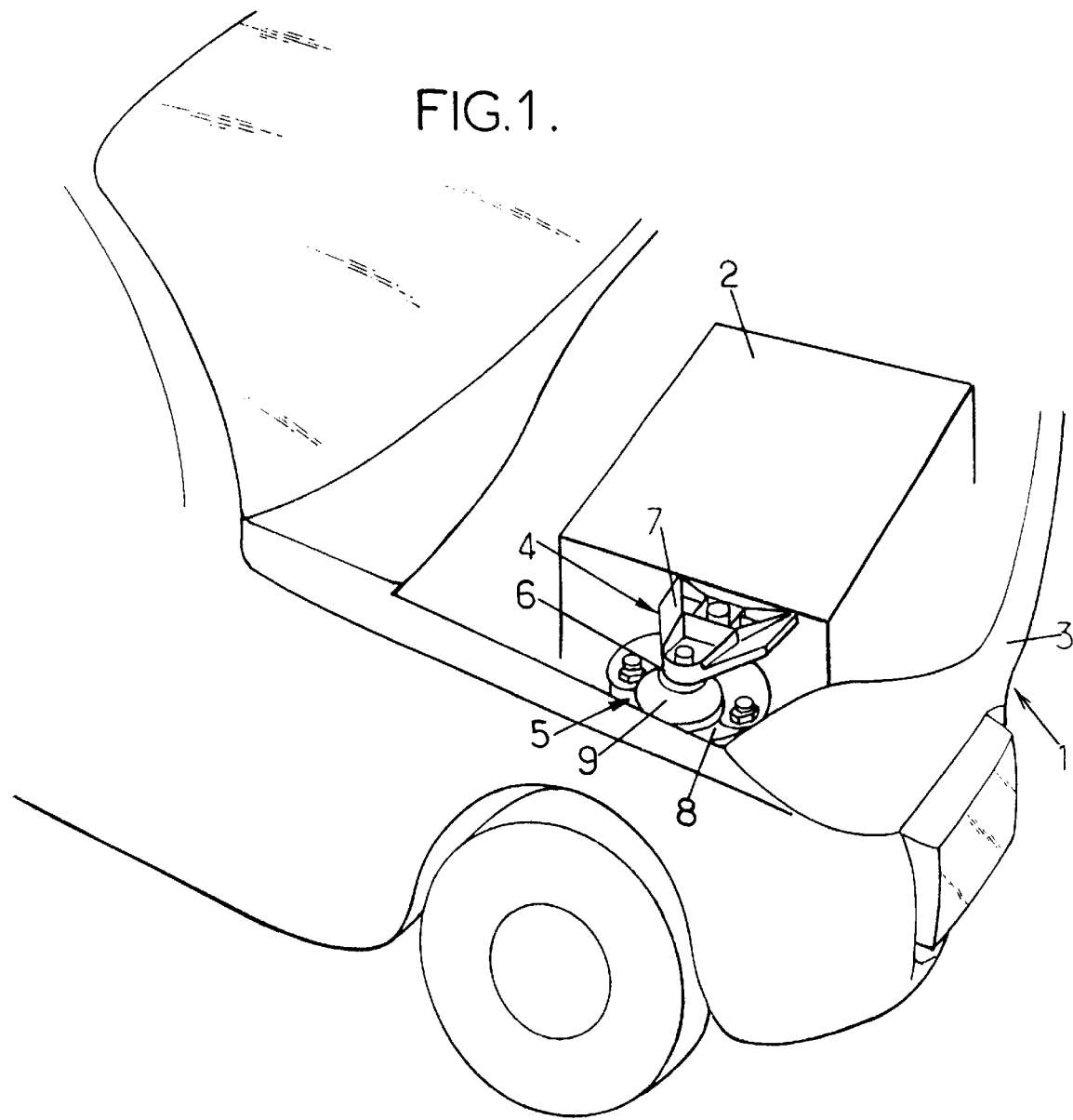
FIG. 1 is a highly diagrammatic view of a motor vehicle fitted with a hydraulic antivibration support, constituting an embodiment of the invention.

The invention relates preferably, but not exclusively, to a motor vehicle 1 having a drive unit 2 supported on the structure 3 of the vehicle via a plurality of fixing devices, one of which can be seen in FIG. 1.

The fixing device 4 comprises a hydraulic antivibration support 5 which has:

- a first rigid strength member 6 made of metal which is fixed to a rigid metal support arm 7 itself secured to the drive unit 2;
- a second rigid strength member 8 made of metal fixed to the structure 3; and
- an elastomer body 9 interconnecting the two strength members 6 and 8.

Figure 2:
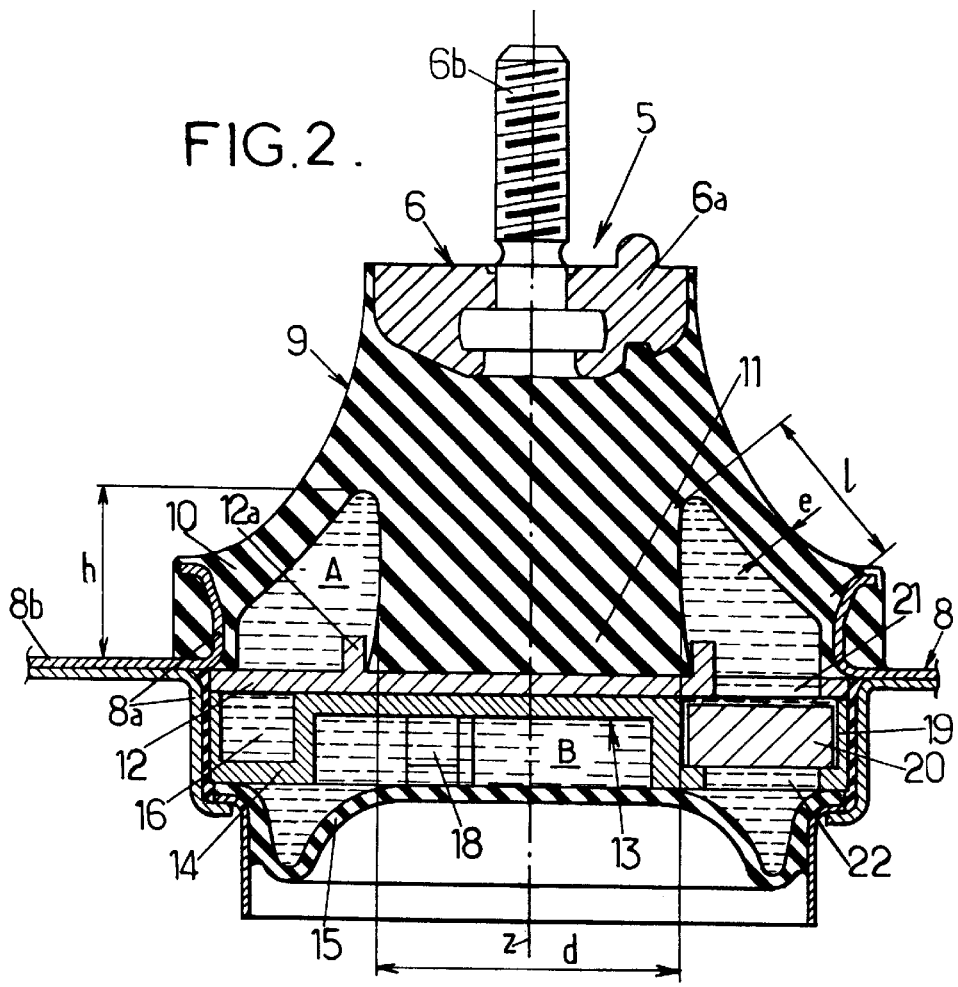
FIG. 2 is an axial section view of the antivibration support fitted to the vehicle of FIG. 1, FIG. 2 showing the support when no load is applied thereto.
Figure 3:
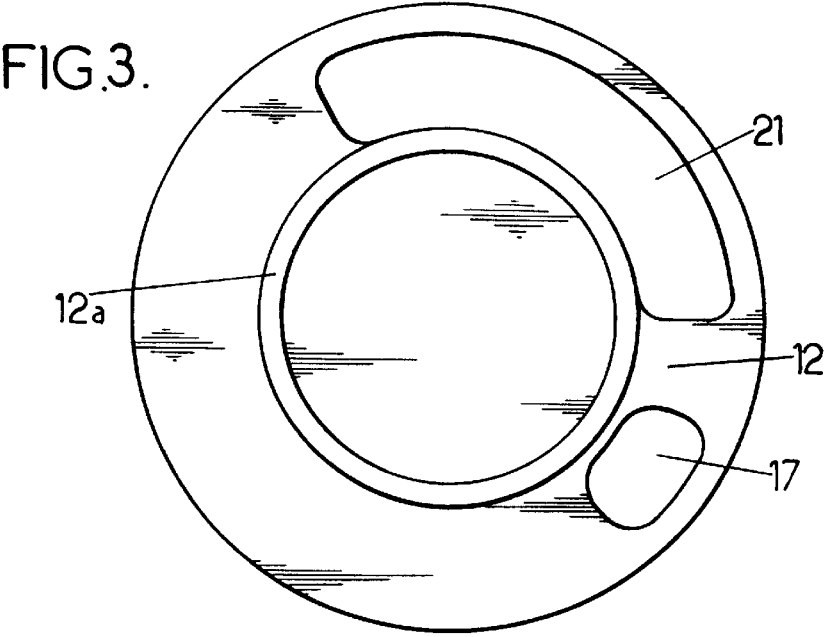
FIG. 3 is a plan view of the baseplate of the FIG. 2 support.

As shown in greater detail in FIGS. 2 and 3, the first strength member 6 is constituted by a central metal stud 6a extended upwards by a pin 6b suitable for fixing to the support arm 7.

The second strength member 8 is in the form of a rigid ring constituted by two annular metal plates that are welded together, each of the plates being internally defined by an axially-folded edge 8a and being extended outwards by fixing tabs 8b, themselves being pierced by fixing holes (not shown).

Finally, the elastomer body 9 comprises a substantially frustoconical side wall 10 that is circularly symmetrical about a central vertical axis Z, said side wall extending between an top secured to the first strength member 6 and an annular base molded over one of the folded edges 8a of the second strength member.

The side wall 9, seen in section on a vertical plane including the axis Z, has a free length l and thickness e such that the aspect ratio l/e of said side wall lies in the range 2 to 8, and preferably less in the range 3 to 6, e.g. being about 4.

Also, and preferably, said side wall 9, still in section view on a vertical plane containing the axis Z, is concave in shape having its concave side facing outwards.

In addition, the elastomer body 9 also has a central leg 11 that is substantially circularly cylindrical, centered on the axis Z and having a free height h and a mean diameter d such that the aspect ratio h/d of the central leg is less than 2, advantageously less than 1, and preferably lies in the range 0.5 to 0.7, e.g. being about 0.6.

The central leg 11 extends axially from the top of the elastomer body down to contact with a metal baseplate 12 secured to the second strength member 8 and preferably having an annular rim 12a surrounding the bottom portion of the central leg 11 and extending upwards a short distance.

The baseplate 12 forms a portion of a rigid partition 13 which also includes a stamped or cast metal plate 14 on which the baseplate is stacked, the partition assembly 13 being fixed to the second strength member 8 by crimping one of the folded edges 8a of said second strength member.

The same crimping makes it possible to fix the periphery of an elastomer bellows 15 in sealed manner to the partition 13 and to the second strength member 8. The bellows 15 is thin and flexible and it co-operates with the elastomer body 3 and with the second strength member 3 to define a sealed container.

The container is subdivided into two chambers by the partition 13, these chambers comprising an annular working chamber A defined by the elastomer body 9, and a compensation chamber B defined by the bellows 15, these two chambers communicating with each other via a narrow passage 16 formed in the partition 13.

More exactly, in the example shown in FIGS. 2 and 3, the narrow passage 16 is defined between the baseplate 12 and a groove formed in the plate 14, this narrow passage 16 opening out vertically into the working chamber A via an opening 17 formed through the baseplate 12 outside the rim 12a, and said narrow passage 16 also opening out radially inwards into the compensation chamber B via an opening 18 formed in the plate 14.

The partition 13 also includes a housing 19 which extends angularly in the vicinity of the periphery of the partition 13, in a portion of said partition that is not occupied by the narrow passage 16.

This housing 19 contains a valve member 20 constituted in this case by a relatively thick elastomer plate.

The horizontal main top face of the valve member 20 communicates with the working chamber A via an opening 21 formed through the baseplate 12, outside the rim 12a, and the horizontal main bottom face of the valve member 20 communicates with the compensation chamber B via an opening 22 formed through the plate 14.

The horizontal dimensions of the openings 21 and 22 are smaller than the horizontal dimensions of the valve member 20 and of the housing 19, so the valve member 20 is held captive in the housing 19, with a small amount of vertical clearance, generally less than 1 mm.

Where necessary, the openings 21 and 22 may be occupied by grids.

Also, instead of being in the form of an elastomer plate held captive in a housing, the valve could be in the form of a relatively flexible wall whose periphery is fixed in sealed manner to the partition 13.

Figure 4:
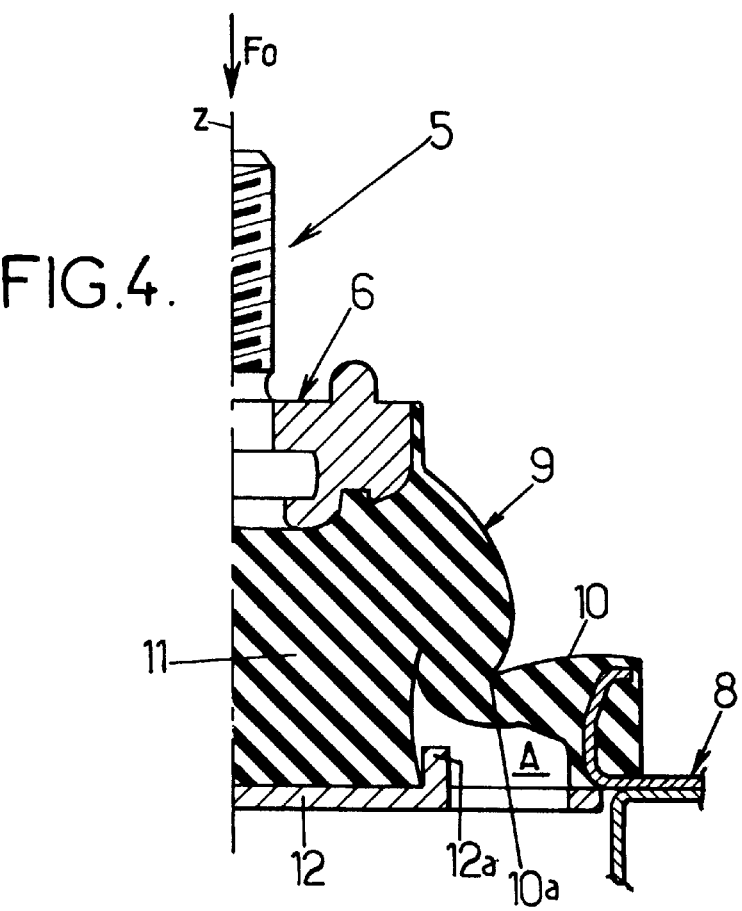
FIG. 4 is a fragmentary axial section view of the FIG. 2 support when a static axial load is applied thereto.

When the above-described device is supporting a static load F0 imposed thereon by the drive unit 2, and which may lie in the range 500 N to 2500 N, for example, the static load compresses the elastomer body 9 as shown in FIG. 4.

More precisely, the static load F0 is supported both by the central leg 11 and by the side wall 10 of the elastomer body, but because the side wall 10 is so slender, it is caused to buckle and forms a fold 10a that extends radially inwards into the working chamber A, whereas because it is so stout, the central leg 11 is subject merely to vertical compression without buckling.

Figure 5:
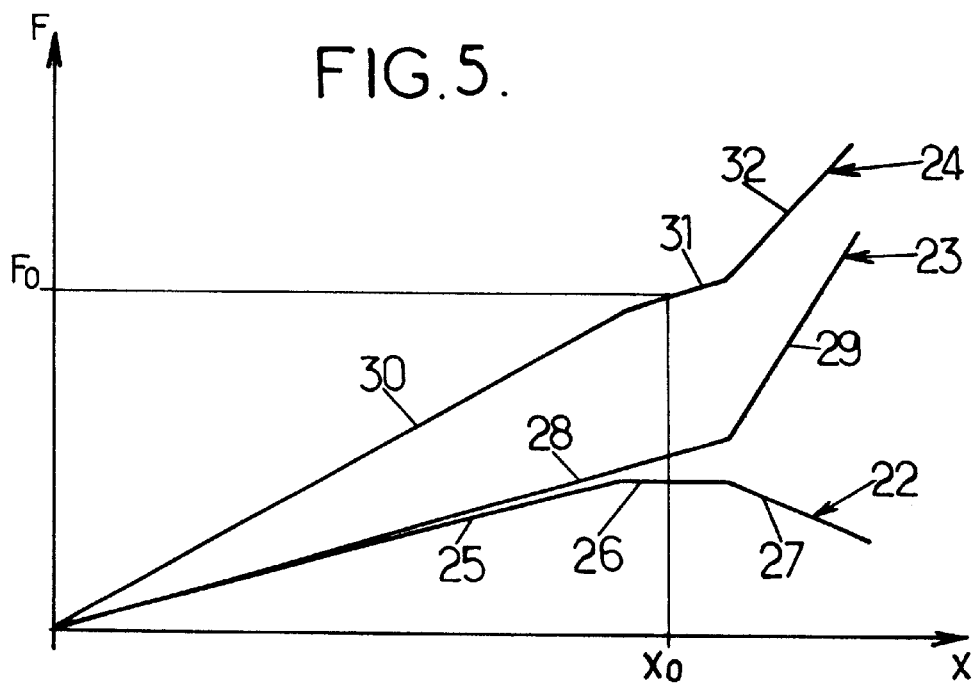
FIG. 5 is a graph showing the relationship between the axial force F applied to the support of FIGS. 2 to 4, and the axial compression x of said support.

This phenomenon is illustrated by the graph of FIG. 5 in which there are three curves 22, 23, and 24 which represent the relationship between the applied axial force F and the distance x the first and second strength members move axially towards each other, respectively for the side wall 10 on its own (curve 22), for the central leg 11 on its own (curve 23), and for the entire elastomer body 9 (curve 24).

In FIG. 5, it can be seen that curve 22 has an initial portion 25 that increases linearly, followed by a substantially horizontal plateau 26, and then a portion 27 that slopes downwards.

The horizontal plateau 26 of curve 22 corresponds to the beginning of buckling in the side wall 10. It should be observed, in particular, that when the side wall 10 is in a state which correspond to said plateau, it is still supporting a non-negligible fraction of the axial load applied to the elastomer body, but, in contrast, it presents stiffness that is substantially zero, given the horizontal nature of the plateau 26.

The curve 23 relating to the central leg 11 has an initial portion 28 that is linear up to a value of x that may correspond, for example, to the end of the plateau 26, followed by a portion 29 of much steeper slope, corresponding to the confinement stiffness of the central leg.

Finally, curve 24 corresponds to a function $F(x)=F1(x)+F2(x)$, where $F1(x)$ and $F2(x)$ are the functions representing the curves 22 and 23.

This curve 23 has an initial portion that is linear, corresponding to relatively high stiffness, e.g. of the order of 150 N/mm, followed by a second linear portion 31 which corresponds to the plateau 26 in the curve 22 and which has a slope that is relatively shallow, representative of stiffness that may be of the order of 80 N/mm, for example, and finally a portion 32 of steeper slope, corresponding to the portion 29 of curve 23.

When the static load F0 is applied to the antivibration support 5, it is subjected to compression x0 such that the point of coordinates (F0, x0) lies on the portion 31 of the curve 24.

In other words, when the static load F0 is applied to the antivibration support 5, the side wall 10 is in a buckling state that corresponds to the horizontal plateau 26, such that said side wall is still contributing to supporting the force F0, but is no longer contributing to the stiffness of the antivibration support for any vibration to which said support is subjected about its equilibrium point.

The load stiffness obtained in this way can be of the order of 80 N/mm, for example, and it makes it possible to obtain excellent attenuation of vibration, and in particular of vibration at relatively high frequency, in the audible range.

In addition, this relatively high frequency vibration of small amplitude is also absorbed by the valve member 20: the antivibration support 5 is therefore highly effective against such high frequency vibration.

Furthermore, against low frequency vibration (e.g. below 20 Hz), that is of relatively large amplitude (e.g. greater than 1 mm), damping is achieved by transferring liquid between the working chamber A and the compensation chamber B via the narrow passage 16.

The buckling of the side wall 10 which forms a fold 10a extending radially into the working chamber and which gives this side wall 10 a substantially horizontal appearance facilitates this liquid-driving effect, thereby increasing the hydraulic efficiency of the device.

Naturally, the invention is not limited to the particular embodiment described above. In particular, it encompasses the variant in which the central leg 11 is prestressed in compression prior to being loaded, with the prestress being provided by the side wall 10, said side wall then being subjected to traction prior to the antivibration support being loaded.

Also, where appropriate, the antivibration support 5 need not be hydraulic, in which case the bellows 15 and the plate 14 can be omitted, with the second strength member 8 then being crimped directly onto the baseplate 12.

We claim:

1. An antivibration support designed to be interposed between two rigid elements to damp and attenuate vibratory motion between said two elements along a vertical central axis and to support a static axial load, lying in the range of 500 N to 2500 N, that is exerted by one of the two elements, said support comprising first and second rigid strength members designed to be secured respectively to the first and second rigid elements that are to be united, and an elastomer body interconnecting the two strength members, said elastomer body having a bell-shaped side wall which extends axially, flaring from a top secured to the first strength member down to an annular base secured to the second strength member, said side wall having at least one slender portion which presents a free length l between the top and the base of the elastomer body and which presents an average thickness e such that the ratio l/e lies in the range 2 to 8, the elastomer body also having at least one support portion adapted to support the static load, and a rigid baseplate secured to the second strength member extending to the center of the annular base of the elastomer body, wherein said slender portion constitutes all of the side wall of the elastomer body, the elastomer body including a central leg which extends vertically from the top of said elastomer body to contact with the baseplate, said central leg constituting said support portion and presenting, between the top of the elastomer body and the baseplate, a free height h and an equivalent diameter d such that the ratio h/d is less than 2, the elastomer body having dimensions such that when the static axial load is applied to the support, the entire side wall of the elastomer body is subjected to buckling and presents substantially zero elastic stiffness, without the central leg being subjected to buckling.

2. An antivibration support according to claim 1, in which the side wall of the elastomer body co-operates with the baseplate to define a working chamber which communicates, via a narrow passage, with a compensation chamber defined by an easily deformable wall, the working chamber, the compensation chamber, and the narrow passage together forming a sealed volume filled with liquid.

3. An antivibration support according to claim 2, in which the side wall of the elastomer body, in section on a vertical plane containing the central axis, is concave in shape with its concave side facing outwards from the working chamber.

4. An antivibration support according to claim 1, in which the ratio l/e lies in the range 3 to 6.

5. An antivibration support according to claim 1, in which the ratio h/d lies in the range 0.5 to 0.7.

6. An antivibration support according to claim 1, in which the elastomer body is circularly symmetrical about the central axis.

7. An antivibration support according to claim 1, in which the baseplate has an annular rim surrounding the central leg of the elastomer body.

8. An antivibration support according to claim 2, in which the baseplate forms a portion of a rigid partition which is fixed to the second strength member and which is interposed between the working chamber and the compensation chamber, said rigid partition defining the narrow passage and also including a passage between the two chambers, said passage being obstructed by a valve member having two main faces, one in communication with the working chamber and the other in communication with the compensation chamber, and including at least a portion that is freely movable towards the working chamber and towards the compensation chamber with clearance of less than 1 mm.

9. An antivibration support according to claim 1, in which the central leg is prestressed in compression by the side wall of the elastomer body.

10. A motor vehicle including an antivibration support designed to be interposed between two rigid elements to damp and attenuate vibratory motion between said two elements along a vertical central axis and to support a static axial load, lying in the range of 500 N to 2500 N, that is exerted by one of the two elements, said support comprising first and second rigid strength members designed to be secured respectively to the first and second rigid elements that are to be united, and an elastomer body interconnecting the two strength members, said elastomer body having a bell-shaped side wall which extends axially, flaring from a top secured to the first strength member down to an annular base secured to the second strength member, said side wall having at least one slender portion which presents a free length l between the top and the base of the elastomer body and which presents an average thickness e such that the ratio l/e lies in the range 2 to 8, the elastomer body also having at least one support portion adapted to support the static load, and a rigid baseplate secured to the second strength member extending to the center of the annular base of the elastomer body, wherein said slender portion constitutes all of the side wall of the elastomer body, the elastomer body including a central leg which extends vertically from the top of said elastomer body to contact with the baseplate, said central leg constituting said support portion and presenting, between the top of the elastomer body and the baseplate, a free height h and an equivalent diameter d such that the ratio h/d is less than 2, the elastomer body having dimensions such that when the static axial load is applied to the support, the entire side wall of the elastomer body is subjected to buckling and presents substantially zero elastic stiffness, without the central leg being subjected to buckling, and two rigid elements interconnected by said support, one of the two rigid elements imposing a vertical static load lying in the range of 500 N to 2500 N on the support, the side wall of the elastomer support being subjected to buckling and then presenting substantially zero elastic stiffness, while the central leg is not subject to buckling.

11. A motor vehicle according to claim 10, including a drive unit and a structure respectively constituting said two rigid elements.

* * * * *